US005769125A

United States Patent [19]
Duer et al.

[11] Patent Number: 5,769,125
[45] Date of Patent: Jun. 23, 1998

[54] INVERSION-RESISTANT, READILY OPENABLE TIDE GATE VALVE

[75] Inventors: Michael Duer; Spiros G. Raftis, both of Pittsburgh; A. Thomas Abromaitis, Sewickley, all of Pa.

[73] Assignee: Red Valve Company, Inc., Carnegie, Pa.

[21] Appl. No.: 622,824

[22] Filed: Mar. 27, 1996

[51] Int. Cl.⁶ .................................................. F16K 15/14
[52] U.S. Cl. ........................... 137/844; 251/358; 137/512
[58] Field of Search .................................. 137/844, 846, 137/849, 850, 512; 251/358

[56] References Cited

U.S. PATENT DOCUMENTS

| Re. 27,399 | 6/1972 | Urso | 137/850 |
|---|---|---|---|
| 181,535 | 8/1876 | Painter | 137/850 |
| 2,328,382 | 8/1943 | Langdon | 137/846 |
| 2,723,678 | 11/1955 | Wilson | 137/844 |
| 2,926,692 | 3/1960 | Zillman | 137/849 |
| 3,121,384 | 2/1964 | Brode | 137/844 |
| 3,490,488 | 1/1970 | Grist | 137/849 |
| 3,730,217 | 5/1973 | Gute | 137/846 |
| 4,492,253 | 1/1985 | Raftis | 137/849 |
| 4,585,031 | 4/1986 | Raftis et al. | 137/846 |
| 4,607,663 | 8/1986 | Raftis et al. | 137/846 |
| 5,209,264 | 5/1993 | Koyanagi | 137/844 |
| 5,330,437 | 7/1994 | Durman | 137/846 |
| 5,606,995 | 3/1997 | Raftis | 137/850 |

Primary Examiner—Denise L. Ferensic
Assistant Examiner—Ramyar Farid
Attorney, Agent, or Firm—Webb Ziesenheim Bruening Logsdon Orkin & Hanson, P.C.

[57] ABSTRACT

The present invention is directed to an inversion-resistant tide gate valve comprising a generally tubular sleeve bounding a longitudinally-extending flow-through passage for fluids, the sleeve having an upstream fluid inlet end region adapted to be affixed to an effluent conduit and a downstream fluid outlet region, the downstream fluid outlet region of the sleeve being integrally formed with a longitudinally-extending trough, where the trough is formed of an integral bottom wall and an integral pair of side walls. A disc is affixed along a first portion of its periphery with a flexible member to the downstream fluid outlet region of the sleeve, and a second portion of the periphery of the disc opposite the first portion rests within the trough on the bottom wall of the trough. A bill associated with the disc and extending longitudinally downstream along the longitudinal axis of the trough rests on the trough when the valve is in its closed position, the bill forming a seal between the disc and the bottom wall of the trough during periods of back flow. The tide gate valve of the present invention resists inversion and opens with minimal head pressure.

19 Claims, 5 Drawing Sheets

INVERSION-RESISTANT, READILY OPENABLE TIDE GATE VALVE

BACKGROUND OF THE INVENTION

1. Field of the Invention

This invention generally relates to check valves, and more particularly to tide gate valves.

2. Description of the Prior Art

A check valve is essentially a valve which allows fluid flow in only one direction through a conduit, while closing and preventing back or reverse flow, when back pressure builds up downstream of the valve to a level greater than the upstream fluid pressure head.

One example where the fluid back-flow problem is especially acute occurs where such valves are used to handle storm sewer effluent. Virtually all municipalities near waterways have storm sewer pipes which empty into the waterways. When there is a storm, storm water from the streets runs into these sewer pipes and flows into the waterways. When the tide is in, or river level is high, these sewer pipes back fill with the water from the waterway. This leaves no or reduced storage capacity in the sewer pipes. In the event there is a large cloudburst or storm during the time that the tide is in, all or a portion of the storm water cannot get in the sewer because the sewer pipes are at least partially filled. This causes street flooding.

Further, sewage treatment plants are often located at sea level and/or the lowest point possible of a municipality. They discharge a large quantity of water after treatment of sewage. Where such treatment plants discharge into a body of salt water, positive shut off is mandatory to prevent salt water intrusion. Salt water intrusion is the backflowing of salt water into the plant. Salt water intrusion must be prevented because salt water will destroy the ongoing biological treatment of sewage, forcing the plant to discharge raw sewage into the waterways, which is a situation that must be avoided.

The cost to water treatment facilities to correct the problems created by a malfunctioning check valve can be enormous. Prior art metal check valves have a tendency to have higher head pressures and malfunction due to rust clogging hinges associated with such valves. Prior art rubber valves suffer from the higher head pressure limitations described above.

Another example where the fluid back flow problem is especially acute is where the check valves are used in chemical plants or municipal waste treatment plants. In such applications, it is desired to permit waste water or treatment chemicals to enter a reaction vessel or pond from a storage container without permitting the contents of the reaction vessel to back-flow into a storage container as the chemical reactions proceed.

To deal with the back-flow problem, particularly to prevent street flooding by storm sewers, various types of tide gate valves have been used. One type consists of a wooden gate which floats up when the tide comes in, thereby closing the tide gate valve to prevent the sewer pipes from filling with the tide water. When the tide goes out, the wooden gate lowers, thereby opening the tide gate valve. Another type consists of a mechanical tide gate valve made of steel. Such valves are subject to corrosion. Spring-loaded valves have been used, and such valves often comprise several moving parts. In many instances, a substantial pressure differential is needed to open and close such valves. Thus, such valves entail a substantial pressure loss in many instances, and such valves may jam in both the open and closed positions, due to the provision of the usual shafts, pivot pins, bushings or bearings. Noise, slamming or chatter are frequently prevalent with such check valves. Sliding, rotating, swinging and plunging parts are subject to wear and failure or jamming, especially when handling slurries or other fluids containing entrained particulate solid material. Such previously used tide gate valves are also subject to jamming when trees, logs, bricks and the like get into the valves and prevent the gates from fully closing.

Another variety of check valve which has been developed in recent years is known as a duck-bill sleeve-type check valve. Such a valve typically includes a generally tubular sleeve boundry a longitudinally-extending flow-through passage for fluids, the sleeve having an upstream fluid inlet region which is affixed to an effluent conduit, an intermediate region disposed between the sleeve and a duck bill, the duck bill being located downstream of the intermediate portion. The duck bill is typically comprised of a pair of symmetrical halves commonly referred to as the valve's lips. The duck bill opens to a generally oval or circular shape to accommodate successively greater fluid flow, but closes with back pressure build-up.

One problem with duck-bill valves, especially but not exclusively in larger sizes, is that when a high back pressure is encountered, the valve's lips at the intermediate region can in some instances collapse and invert, thus permitting an undesirable back-flow of fluid. This problem is intensified for large size pipes on the order of 24 inches or even greater diameter, because the larger the diameter of the valve, the larger the area of the valve, and in such cases, even a low back pressure multiplied times a large valve area will provide sufficient force to collapse and invert the valve's lips, thus allowing reverse-flow or back-flow of fluid to take place.

A related design problem with the duck-bill concerns the sagging of the intermediate region of the valve body. Where the intermediate region of the sleeve of the valve is particularly long or thin, the weight of the fluid in the intermediate region will cause the intermediate region of the sleeve to sag and impede the proper flow of fluid through the valve and proper sealing of the valve.

Where such sagging is present for extended periods, such valves, typically constructed of elastomeric materials, will not have a positive shut off, but will "take a set" if sagging or in an open position for an extended period of time. Taking a set refers to a common development in rubber valves where when such valves are open or sagging for an extended period of time, the rubber tends to hold or retain the open position. In many cases this will force the valve's lips to remain in an open position even when there is no water or other effluent flowing through the valve. Thus taking a set impedes the valve's ability to close properly and is to be avoided as the valves are then open to the unwanted back-flow of effluent.

Another related design problem associated with the duck-bill type tide gate valve concerns the ease of opening the valve. The more one attempts to design the valve to resist inversion, the less easy the valve is to open. Thus if one constructs the valve with rigid materials, the valve will certainly resist inversion and sagging, but at the expense of making the valve much tougher to open, requiring much higher pressure differential to open the valve. The reverse situation also is true. That is, if one constructs the valve with very flexible materials, the valve will certainly open easily, but at the expense of resisting inversion and in turn, causing the valve to sag more readily. Due to the inherent design of the duck-bill check valve, it is difficult to fabricate the duck-bill valve such that the easy opening and inversion resistant characteristics are independent of one another.

Tide gate valves disclosed in U.S. Pat. Nos. 4,492,253; 4,585,031; and 4,607,663 overcome many of the above-described problems, but suffer from the limitation that they cannot be used where the effluent pipe to which they are attached rests on or near the sea floor, lake bed or the like or where, as when used in a chemical plant setting, there is little room around the effluent pipeline. Similarly, in some applications it is desirable to install the tide gate valve entirely within the inside of the effluent pipe, and the tide gate valves of the prior art, with their flared portions, are not suited to do so. In the alternative, if a valve whose flared lips is chosen such that it can be installed within the inside of an effluent pipe, the effective diameter of the tide gate valve must be significantly smaller than the effluent pipe diameter to accommodate the flared portion of the tide gate valve, severely restricting the flow through the valve and effluent pipe.

A need remains in the art for a tide gate valve which is not subject to corrosion, which will open with a very low head pressure, yet where the valve retains the ability to resist inversion during periods of high back-flow pressure.

SUMMARY OF THE INVENTION

It is a general object of this invention to provide a reliable, improved tide gate valve which resists inversion of the valve's lips, but which nevertheless opens easily.

It is another object of this invention to provide a tide gate valve which opens and closes in response to a predetermined minimum pressure, and which nevertheless is highly resistant to inversion.

It is yet another object of the present invention to provide a tide gate valve which can be used where the effluent pipe to which it is attached rests on or near the sea floor, lake bed or the like or where, as when used in a chemical plant setting, there is little room around the effluent pipeline.

It is still another object of the present invention to provide a tide gate valve which can be installed within the inside of an effluent pipe, and where there is no significant restriction of the flow of effluent through the valve and effluent pipe.

It is yet another object of the present invention to provide a tide gate valve which will not "freeze" in the open and/or closed position due to corrosion, nor be susceptible to catastrophic failure due to corrosion.

In keeping with these objects and others which will become apparent hereinafter, the present invention is directed to an inversion-resistant tide gate valve comprising:

(a) a generally tubular sleeve bounding a longitudinally-extending flow-through passage for fluids, the sleeve having an upstream fluid inlet end region adapted to be affixed to an effluent conduit and a downstream fluid outlet region;

(b) the downstream fluid outlet region of the sleeve being integrally formed with a longitudinally-extending semi-cylindrical trough, the trough having a bottom wall and a pair of side walls integral with the bottom wall, the trough formed with the downstream fluid outlet region of the sleeve so as to provide a flow-through passage for the fluids;

(c) a disc affixed along a first portion of its periphery to a hinge-like flexible member, the flexible member being affixed to and interposed between the disc and the downstream fluid outlet region of the sleeve, and wherein a second portion of the periphery of the disc opposite the first portion rests within the trough on the bottom wall of the trough when the valve is in a closed position, wherein the disk opens the valve in response to head pressure; and (d) a bill affixed at a first end to one or more of the group consisting of the sleeve, the flexible member, and the disc, the bill extending longitudinally downstream along the longitudinal axis of the trough, the bill being integrally formed with the side walls of the trough, the bill being formed of a flexible material, the bill forming an opening for discharge of fluid in response to a head pressure within the valve from the fluid, and the bill forming a seal to prevent backflow of the fluid through the valve when no head pressure is present.

The present invention overcomes the design problems associated with prior art rubber check valves. The proposed valve opens with less head pressure than prior art valves, has a positive shut off and will not "take a set" if open for an extended period of time.

The novel features which are considered as characteristics of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

In this detailed description of the preferred embodiments of the invention, the term "tide gate valve" will generally be used, but it is to be understood that this is only one of several synonymous terms for the same type of check valve.

Figure 1:
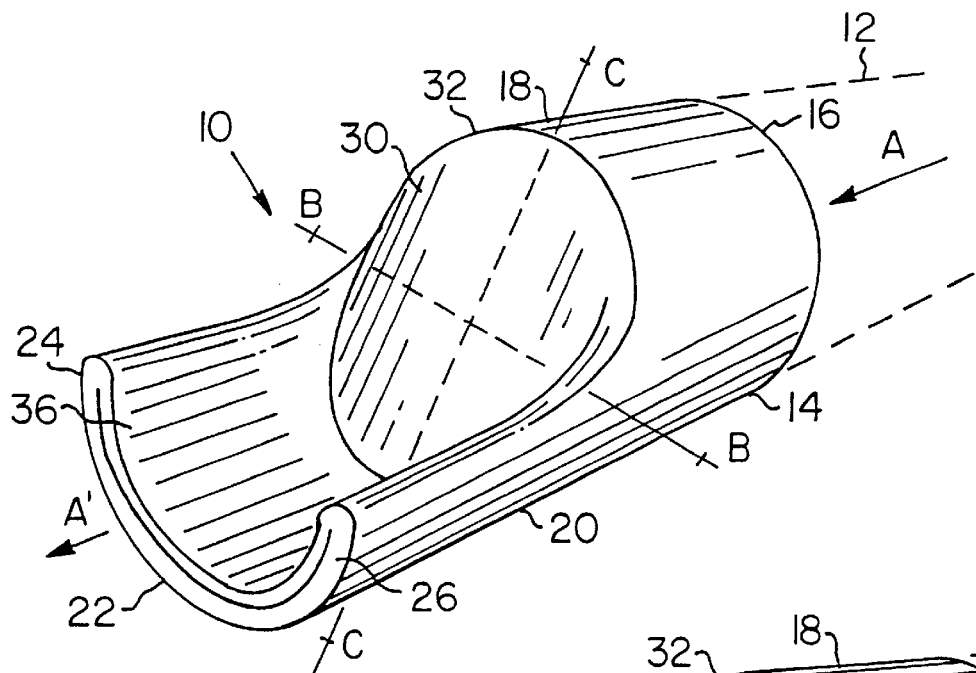
FIG. 1 is a perspective view of the tide gate valve of the present invention showing the valve in a closed position.
Figure 2:
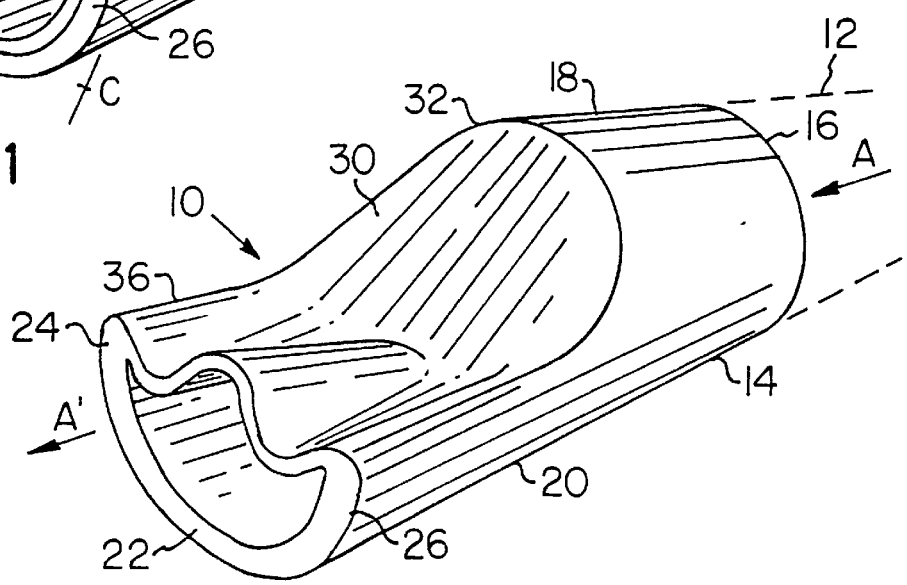
FIG. 2 is perspective view of the tide gate valve of the present invention showing the valve in a partially open position.
Figure 3:
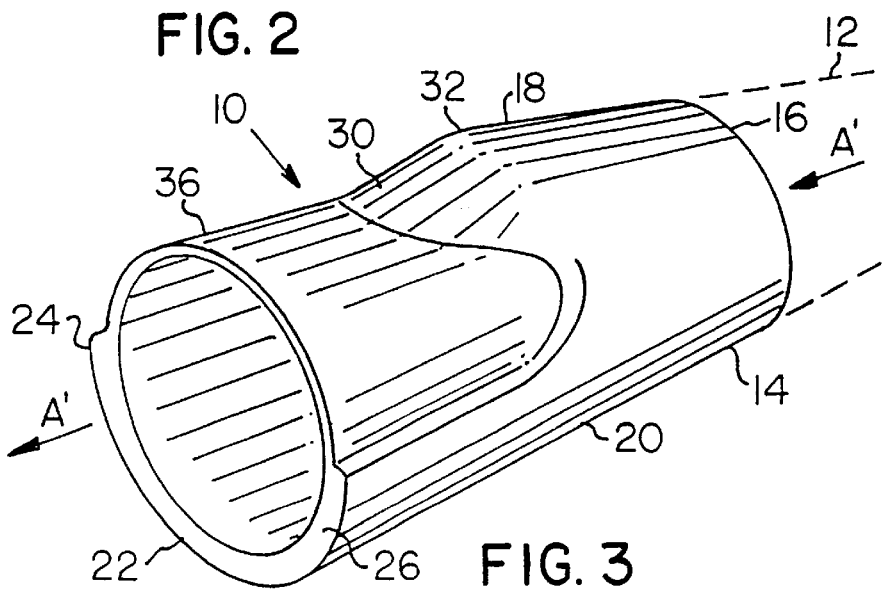
FIG. 3 is a perspective view of the tide gate valve of the present invention showing the valve in a fully open position.

Referring now to FIGS. 1–3, a tide gate valve 10 is shown mounted at a discharge end of a conduit 12, shown in phantom, from which fluids are discharged in the direction shown by the arrows A and A'. The conduit 12 may be a storm sewer, an industrial waste pipe, or any pipe which discharges an effluent into a river, creek, ocean or analogous waterway or a chemical reaction vessel or any vessel known in the art where it is desired to discharge a fluid while preventing back-flow into the conduit 12.

The valve 10 generally comprises a sleeve 14, which bounds a longitudinally-extending flow-through passage for the effluent fluid which may be a liquid or slurry, such as raw sewage, storm rain water, sludge, chemical slurry, scum paper stock, tailings slurry, or any industrial waste. More specifically, the sleeve 14 has a generally cylindrical upstream fluid inlet region 16 which is either mounted on or within the discharge end of conduit 12.

Fluid inlet region 16 may be secured to the exterior of conduit 12 by any devices commonly known in the art such as bands, clamps, etc. Alternatively, fluid inlet region 16 may be affixed to the interior of conduit 12 by means known in the art. In still another embodiment, fluid inlet region 16 may include a flange which corresponds to a mating flange of conduit 12, and the two flanges, when mated, may be secured to each other by any means known in art, such as bolts and nuts and the like.

The sleeve 14 terminates at a second downstream end with a fluid outlet region 18. Fluid outlet region 18 is in turn integrally associated with a trough 20. Trough 20 is shown in FIGS. 1–3 as semi-cylindrical in design, but it is to be understood that it could be designed as a U-shaped or V-shaped channel or the like. While a semi-cylindrically shaped trough typically does not include a pair of clearly defined side walls and a clearly defined bottom wall, conceptually at least for the following discussion, it will be assumed that the semi-cylindrical shaped trough 20 is comprised of a bottom wall 22 and two side walls, 24 and 26 respectively.

Figure 4:
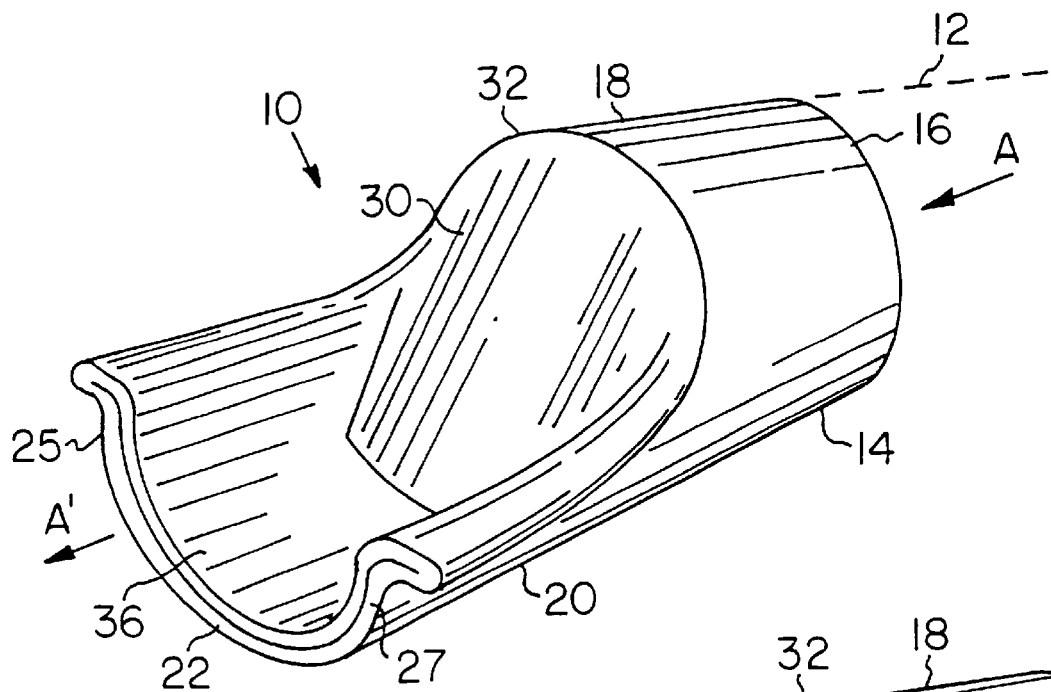
FIG. 4 is a perspective view of an alternative embodiment of the tide gate valve of the present invention showing flared side walls.

As shown in FIG. 4, in an alternative embodiment of the present invention, trough 20 may be formed with bottom wall 22 and flared side walls 25 and 27, which assist in the sealing process and will increase the effective diameter of the valve 10 when in its open position. Further, flared side walls 25, 27 assist in opening the valve, as they facilitate the opening of valve 10 by permitting bill 36, explained in detail below, to easily rise above the centerline of valve 10 during periods of discharge of effluent through valve 10.

Referring to FIGS. 1–4, sleeve 14 and trough 20 must be formed of materials having sufficient strength to support the weight and pressure of effluent flowing through valve 10. This material may take the form of one or more layers or plies of elastomeric material. Where formed of an elastomeric material, the material and the number and thickness of layers or plies must be selected based upon the weight of effluent that will be traveling through valve 10 so as to minimize sagging or distortion of sleeve 14 or trough 20. For most applications, a Shore A durometer of 65 to 95 will suffice.

Figure 5:
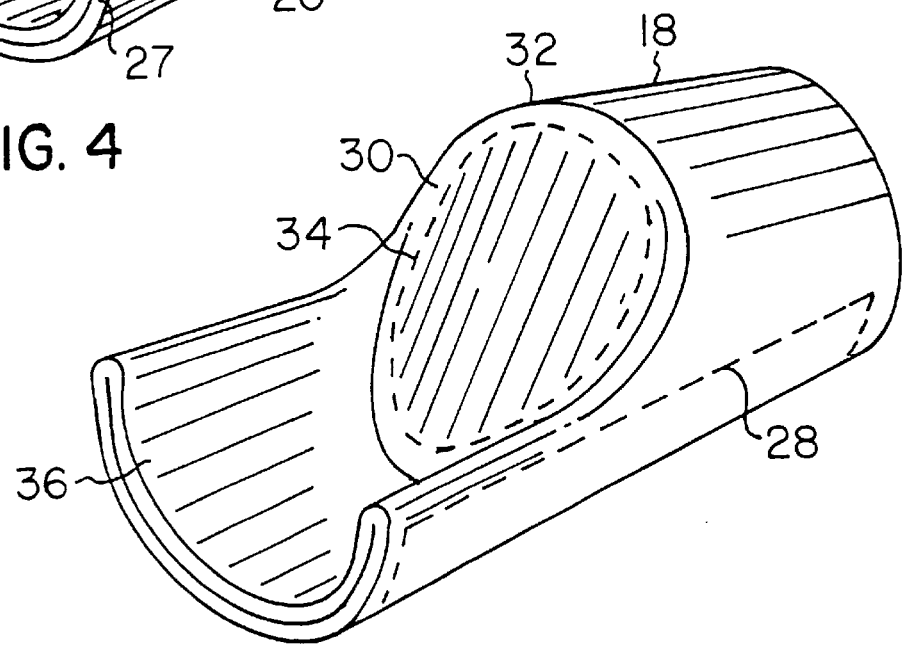
FIG. 5 is a perspective view of the tide gate valve of the present invention showing a body plate shown in phantom embedded in the sleeve and trough portions of the valve and a disc plate shown in phantom embedded in the disc portion of the valve.

Sleeve 14 and trough 20 are collectively referred to as the body of the valve. In an alternative embodiment of the present invention as shown in FIG. 5, the body of the valve 10 may include a body plate 28, also known as a body stiffener. Where valve 10 is formed of one or more plies or layers of an elastomeric material, body plate 28 may be located on the exterior portion of valve 10, the interior portion of valve 10, or in a preferred embodiment may be embedded within the elastomeric material. Body plate 28 may be made of virtually any material provided it is sufficiently rigid to support the weight of the effluent flowing through valve 10. In a preferred embodiment, body plate 28 is preferably made of a metal which can withstand the conditions under which the valve is employed, should the body plate 28 inadvertently become exposed to the atmosphere or effluent, despite being embedded within the elastomeric material. Body plate 28 could extend around the entire circumference of sleeve 14. However, in a preferred embodiment, body plate 28 does not rise vertically above the centerline of valve as shown in FIG. 5, in which body plate 28 is embedded in side walls 24,26, (or alternatively, side walls 25 and 27) of trough 20, and is embedded at the same vertical height within sleeve 14, as shown in FIG. 5.

Valve 10 further includes disc 30 as shown in FIGS. 1–4. Disc 30 is composed of an elastomeric material and is affixed to fluid outlet region 18 of sleeve 14 via flexible member 32 which is in the nature of an elastomeric hinge.

In a preferred embodiment, the width of disc 30, as shown along line B—B in FIG. 1 is coextensive with the distance between side walls 24 and 26 of valve 10, thereby forming a seal against fluid from back-flowing through valve 10 into conduit 12, with additional sealing being accomplished by bill 36 as explained below. The length of disc 30 as measured along line C—C of FIG. 1, and extending from flexible member 32 to bottom wall 22 of trough 20 must be longer than the interior diameter of sleeve 14. As shown in FIGS. 1–9A and 12, this will prevent disc 30 from assuming a perpendicular or 90 degree angle with bottom wall 22, but will instead, ensure that disc 30 in a closed position assumes the inclined plane position as shown in FIGS. 1–9A. Such a position will prevent disc 30 from inverting and entering sleeve 14 and reduce the amount of head pressure through sleeve 14 that is needed to open valve 10, and facilitate less than full flows of effluent through conduit 12 as shown in FIGS. 2 and 9B. The valve 10 is shown in its fully open position in FIGS. 3 and 9C with a full flow of effluent through conduit 12.

Figure 6A:
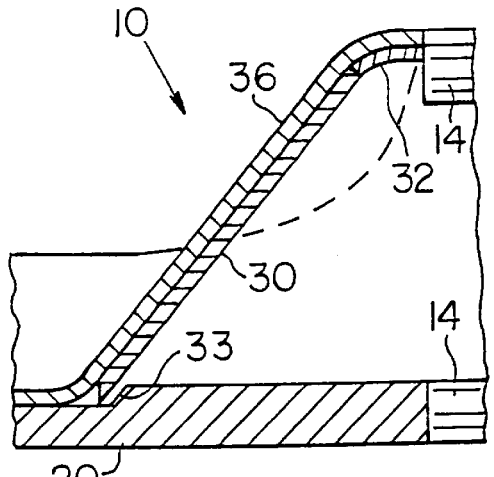
FIG. 6A is a side sectional view of the tide gate valve of the present invention showing the bill on the outer surface of the disc and showing the bill affixed to the fluid outlet region of the sleeve and also showing an integral seat for the disc.
Figure 6B:
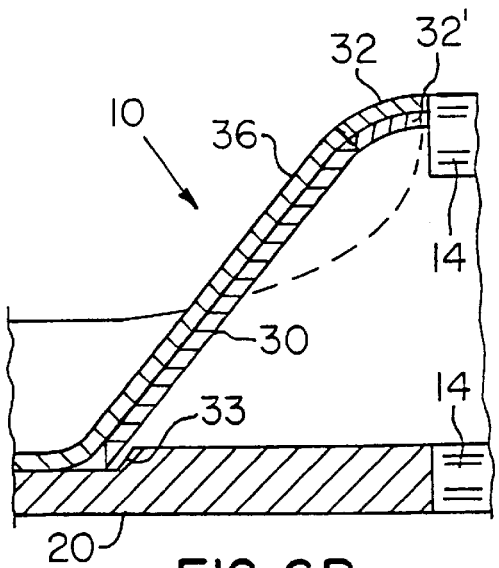
FIG. 6B is a side sectional view of the tide gate valve of the present invention showing the bill on the outer surface of the disc and showing the bill affixed to the flexible member and also showing an integral seat for the disc.
Figure 6C:
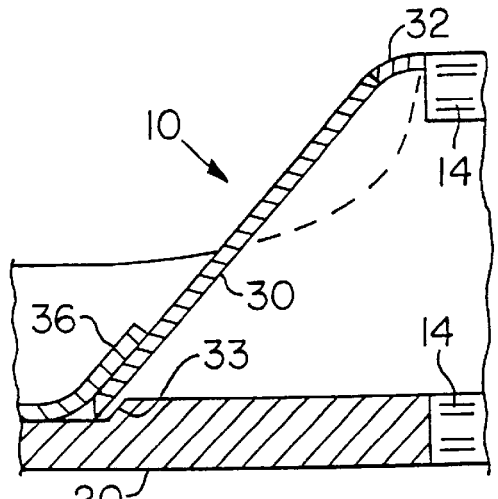
FIG. 6C is a side sectional view of the tide gate valve of the present invention showing the bill on the outer surface of the disc and showing the bill affixed to the disc and also showing an integral seat for the disc.

In an alternative embodiment of the present invention, as shown in FIGS. 6A–6C, bottom wall 22 (shown) and/or side walls 24,26 (or, alternatively side walls 25,27, and/or fluid outlet region 18, not shown) of sleeve 14 may include an integral rubber seat 33, also known as a lip, upon which disc 30 rests in its closed position. In this embodiment, disc 30 not only rests on the bottom of the trough 20, but also on integral rubber seat 33, which prevents disc 30 from slipping into sleeve 14 during periods of high pressure back flow, and will also aid in the sealing of disc 30 with sleeve 14. It is to be noted that where the bottom wall and side walls of trough 20 and fluid outlet region 18 of sleeve 14 all include integral rubber seat 33, the entire circumference of disc 30 will rest upon integral rubber seat 33 when valve 10 is in its closed position which although not shown is best indicated in FIG. 1.

Disc 30 may be a flat disc, or may be formed as a convex or concave disc to provide greater rigidity. A convex disc, with regard to the direction of backflowing water towards valve 10, is preferred to provide the greatest rigidity to disc 30 during such periods of high pressure backflow. Making disc 30 convex provides a substantial increase in the strength of disc 30, significantly increasing its ability to resist inversion.

Disc 30, sleeve 14 and trough 20, may each be formed of one or more plies of an elastomeric material, provided they are formed of sufficient strength to withstand the back pressures to which valve 10 will be subjected and the weight of effluent traveling through valve 10. For most applications, elastomeric materials having a Shore A durometer of 65 to 95 will suffice.

In still another embodiment of the present invention as shown in FIG. 5, disc 30 may include a disc plate 34, also known as a stiffening plate, for additional inversion protection. The disc plate 34 may be generally coextensive in size with the dimensions of disc 30 along its periphery as shown in phantom in FIG. 5. Alternatively, disc plate 34 may be in the form of a rim coextensive with the circumference of disc 30, not shown. Disc plate 34 may either be affixed to the exterior or interior surfaces of disc 30 of valve 10, or may be embedded within disc 30 where disc 30 is formed of one or more plies of an elastomeric material.

Flexible member 32 may be any hinge known in the art, but is preferably an elastomeric hinge comprised of one or more plies of an elastomeric material. Flexible member 32 may be of "tire-cord" design, which is a polyester fabric that has considerable strength in one direction and is very flexible at right angles to the first direction. Further, the flexible member 32 may be made with a lower durometer rubber to provide greater flexibility in this area.

Figure 10A:
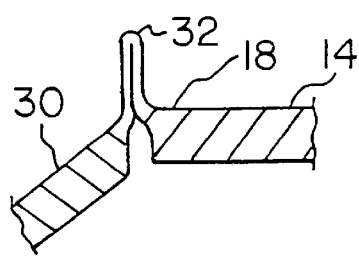
FIG. 10A and 10B are side sectional views of an expansion loop associated with the flexible member of the tide gate valve of the present invention showing the valve in closed and partially open positions respectively.
Figure 10B:
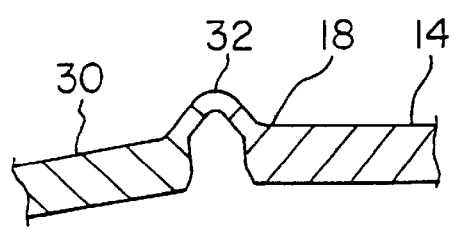

Shown in FIGS. 10A and 10B are an alternative embodiment of flexible member 32. Shown in FIGS. 10A and 10B is disc 30 which is affixed to fluid outlet region 18 of sleeve 14 in a hinge-like manner via flexible member 32. Flexible member 32 shown in FIGS. 10A and 10B includes an expansion loop of material that will allow room for the movement of disc 30 as the valve 10 is opening in response to head pressure. The expansion loop avoids the potential situation where flexible member 32 is made so tight as to interfere with the opening of disc 30. Specifically shown in FIG. 10A is flexible member 32 having an expansion loop wherein the valve is in a closed position. As shown in FIG. 10B, when the valve is partially open due to effluent pressure through conduit 12, flexible member 32 provides the necessary hinging function for disc 30 but in addition, provides room for the movement of disc 30 away from fluid outlet region 18 thereby permitting the disc 30 to open more easily with less head pressure.

In the following discussion, by outer surface of disc 30 it is meant that surface of disc 30 which is impacted by effluent during periods of back-flow. By inner surface of disc 30 it is meant that surface of disc 30 which is impacted by effluent discharging though valve 10 during periods of discharge. Valve 10 further includes bill 36 as shown in FIGS. 1–9 and 11. Bill 36 is preferably comprised of one or more plies of an elastomeric material which is quite flexible, even approaching flimsy in character. Bill 36 operates to provide a seal against back-flow of effluent through valve 10. In operation of the valve 10, effluent discharging through valve 10 simply lifts disc 30 and bill 36 out of its way as it travels through valve 10. Substantial, if not complete resistance to any back-flow is provided by the fact that bill 36 easily seals with minimal backpressure along trough 20 while disc 30 is prevented from inverting into sleeve 14 for the reasons set forth above.

In one embodiment of the present invention, as shown in FIGS. 6A–6C, bill 36 is located on the outer surface of disc 30. Shown in FIG. 6A is the attachment of bill 36 to the sleeve 14. Disc 30 is attached to the sleeve 14 via flexible member 32. Shown in FIG. 6B is the attachment of bill 36 to flexible member 32. Shown in FIG. 6B is a second flexible member, 32' which affixes disc 30 to sleeve 14. It should be noted that flexible member 32 and 32' could be combined into a single flexible member to which is attached to both bill 36 and disc 30. In still another embodiment of the present invention as shown in FIG. 6C, bill 36 is affixed to disc 30. Bill 36 may be affixed to disc 30 at any point on disc 30 provided bill 36 is affixed around a sufficient circumference of disc 30 so as to form a seal against backflow of the effluent into sleeve 14.

Figure 7A:
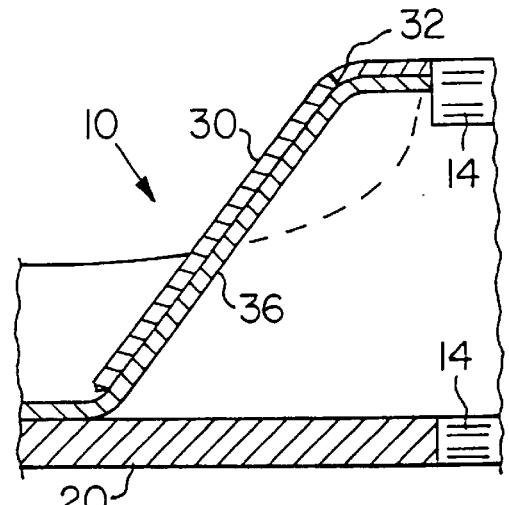
FIG. 7A is side sectional view of the tide gate valve of the present invention showing the bill on the inner surface of the disc and showing the bill affixed to the fluid outlet region of the sleeve.
Figure 7B:
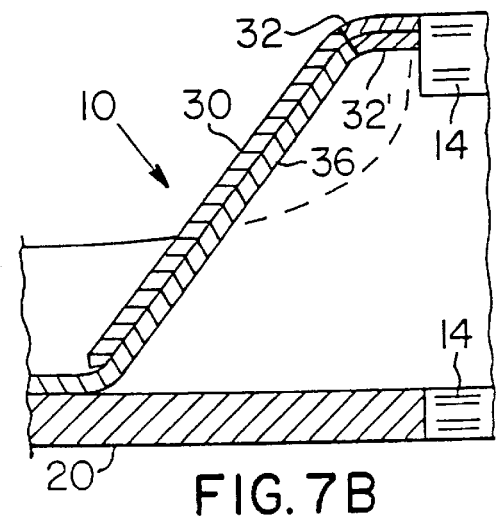
FIG. 7B is a side sectional view of the tide gate valve of the present invention showing the bill on the inner surface of the disc and showing the bill affixed to the flexible member.
Figure 7C:
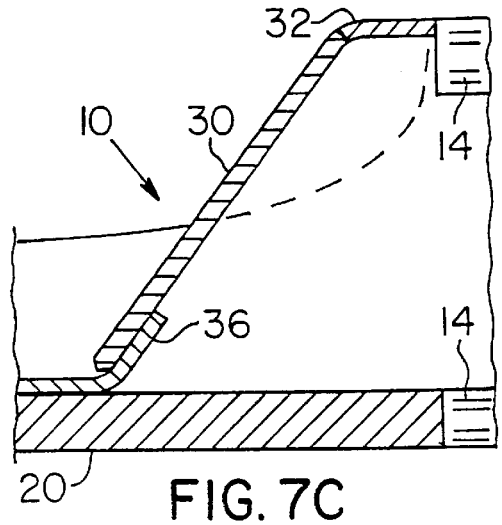
FIG. 7C is a side sectional view of the tide gate valve of the present invention showing the bill on the inner surface of the disc and showing the bill affixed to the disc.

Shown in FIG. 7A–7C is an alternative embodiment of the present invention wherein bill 36 is affixed to the inner surface of disc 30. As shown in FIG. 7A, bill 36 may be affixed directly to sleeve 14 while disc 30 is affixed to sleeve 14 via flexible member 32. In an alternative embodiment, as shown in FIG. 7B, disc 30 is affixed to sleeve 14 via flexible member 32 while bill 36 is affixed to sleeve 14 via flexible member 32'. As noted above in connection with FIG. 6B, in a similar fashion as shown in FIG. 7B, flexible member 32 could be a single member to which both disc 30 and bill 36 are affixed. As shown in FIG. 7C, disc 30 may be attached to sleeve 14 via flexible member 32 while bill 36 is affixed to disc 30. As noted above, in connection with FIG. 6C, in a similar fashion as shown in FIG. 7C, bill 36 may be affixed at any point on disc 30 provided it is affixed about a sufficient amount of the circumference of disc 30 so as to form a seal against backflow of effluent through the valve 10.

Figure 8:
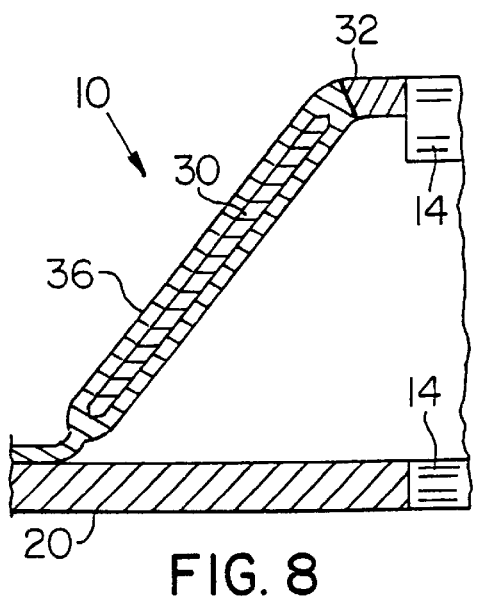
FIG. 8 is a side sectional view of the tide gate valve of the present invention showing the disc embedded in the bill and showing the bill affixed to the fluid outlet region of the sleeve.

Shown in FIG. 8 is another embodiment of the present invention in which disc 30 is embedded within bill 36 and wherein bill 36 is affixed to sleeve 14 via flexible member 32. It should be noted that with respect to FIG. 8, it is also possible to attach bill 36 directly to sleeve 14 without the use of flexible member 32.

Figure 9A:
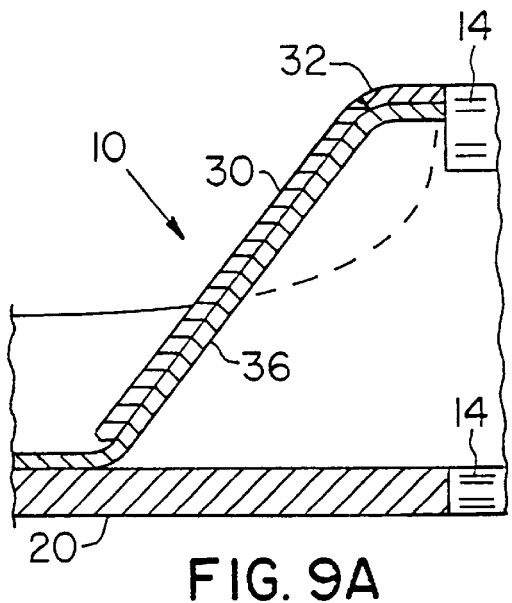
FIG. 9A is a side sectional view of the tide gate valve of the present invention showing the bill on the inner surface of the disc and showing the bill affixed to the fluid outlet region of the sleeve and showing the valve in a closed position.
Figure 9B:
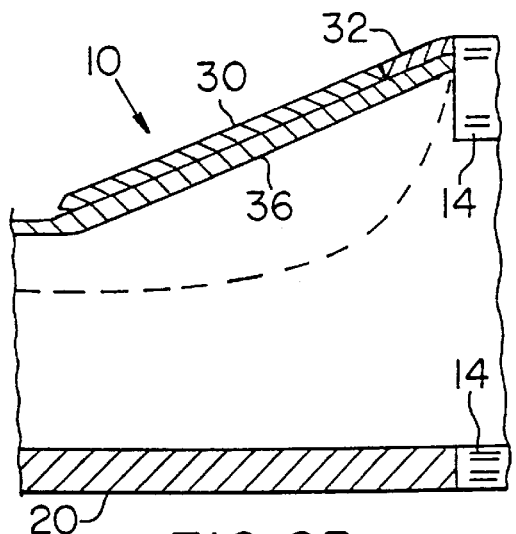
FIG. 9B is a side sectional view of the tide gate valve of FIG. 9A showing the valve in a partially open position.
Figure 9C:
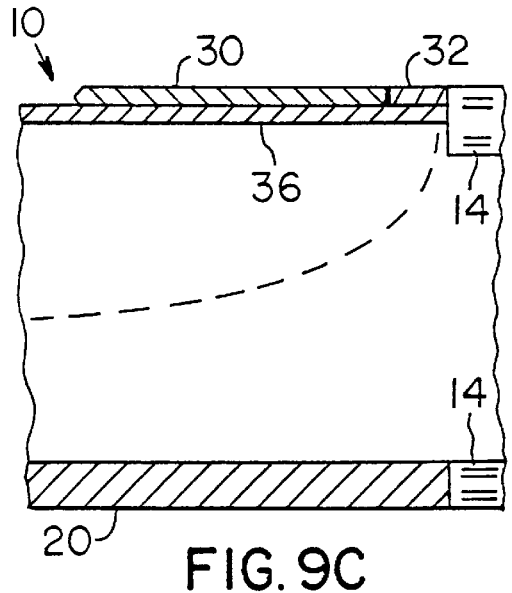
FIG. 9C is side sectional view of the valve of FIG. 9A showing the valve in a fully open position.

Shown in FIG. 9A–9C are side sectional views of the tide gate valve of the present invention, wherein bill 36 is on the inner surface of disc 30 and disc 30 is affixed to sleeve 14 via flexible member 32. This embodiment has been chosen as simply representative of the foregoing discussed embodiments, to show the operation of the valve 10. As shown in FIG. 9A, the disc 30 rests at an incline plane when the valve 10 is closed. As shown in FIG. 9B, wherein the valve 10 is in a partially opened position, the flow of effluent through the sleeve 14 lifts disc 30 and bill 36 permitting effluent to flow through the valve 10. As shown in FIG. 9C, a full flow of effluent through sleeve 14 will fully extend disc 30 and bill 36 to permit the full flow of effluent through the sleeve 14 to flow through the valve 10. When the flow of effluent through the sleeve 14 is stopped, the valve will return due to the force of gravity to the position shown in FIG. 9A whereupon the bill 36 will seal the valve 10 against any backflow of effluent through the valve 10.

Figure 11A:
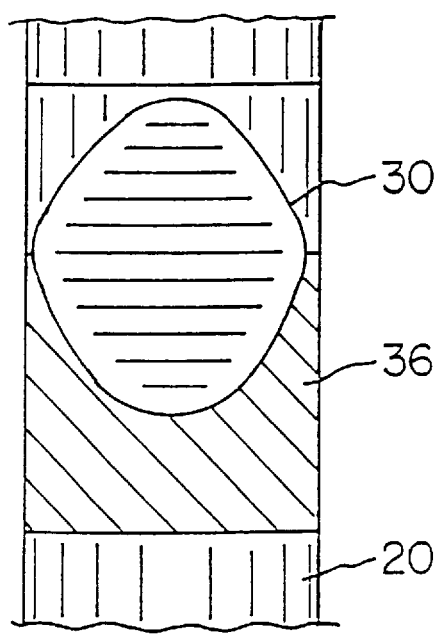
FIGS. 11A and 11B are plan section views of the valve of the present invention in which in FIG. 11A, the bill is shown as terminating perpendicular to the trough and in FIG. 11B, the bill is shown as terminating with all points on its downstream edge equidistant from the disc.
Figure 11B:
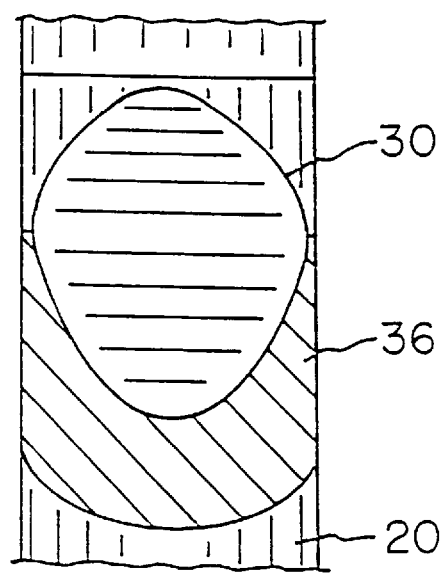

Referring now to FIG. 11A, there is shown an embodiment wherein the downstream edge of the bill 36 terminates such that all points on the downstream edge of the bill 36 lie along a line which is perpendicular to the longitudinal axis of trough 20. In an alternative embodiment as shown in FIG. 11B, the downstream edge of bill 36 may be terminated such that all points along the downstream edge of the bill 36 lie equidistant from disc 30.

The fact that the circumference of valve 10 in its entirety is for the most part coextensive with the circumference of sleeve 14 means that valve 10 has no upwardly extending or downwardly extending portions, as was common with duck-bill type valves of the prior art. This permits valve 10 to be used where the effluent pipe to which it is attached rests on or near the sea floor, lake bed or the like or where, as when used in a chemical plant setting, there is little room around the effluent pipeline. Similarly, in applications where it is desirable to install the tide gate valve entirely within the inside of the effluent pipe, and the tide gate valve 10 of the present invention, having no upwardly or downwardly extending portions, is well suited to do so, and can be installed within the inside of the effluent pipe without forcing the diameter of the tide gate valve to be significantly smaller than the effluent pipe diameter as had been known in the prior art to accommodate the upwardly and downwardly extending portions of the prior art tide gate valves, which in turn severely restricted the flow through the valve and effluent pipe of such prior art tide gate valves.

Further, because of its construction the valve 10 of the present invention has extremely low head loss. This is particularly important in municipalities which require that check valves on their outfall lines be installed in the lowest ground level of their community because storm water and effluent are discharged by gravity flow. Reduction in pressure drop of even a few inches of water is very critical. Low pressure drop affects drainage off the streets near the outfall lines and the construction of the present invention reduces pressure drop considerably. Further, the present invention uses gravity as an aid in achieving positive sealing of the bill 36 and disc 30 of the valve 10 thereby preventing backflow of effluent through conduit 12. Further, the present invention overcomes the prior art problem of sagging, wherein the check valve, due to the weight of the rubber part and the water in the line, take a "set" and sag and gap open because of prolonged flow in an open position and weight of the water.

The materials of construction as noted above are preferably all elastomeric, such as neoprene or an elastomer reinforced with synthetic fabric, such as nylon or polyester with construction similar to an automobile tire. This construction can also include embedded metal cable, wire, disks, discs, rings and tubes to reinforce specific areas. As noted above, typically the sleeve 14, the trough 20 and the disc 30 are made of stiff elastomeric material for strength and have limited flexibility and may, for example, be comprised of synthetic rubber such as styrene butadiene copolymer (hereinafter "SBR"). Where the weight of the effluent is great, as with large discharge lines, disc 30 and/or the valve body comprised of sleeve 14 and trough 20 may be comprised of a composite structure of elastomeric material with or without synthetic fabric or metal plate or rim reinforcing, which is stiff enough to hold the weight of the water flowing through the valve and safely resists the reverse pressure of backflow.

To the extent necessary to define the present invention, U.S. Pat. Nos. 4,492,253; 4,585,031; and 4,607,663 are hereby incorporated herein by reference.

It will be understood that each of the elements described above, or two or more together, also may find a useful application in other types of constructions different from the types described above.

While the invention has been illustrated and described as embodied in an inversion-resistant, readily openable tide gate valve, it is not intended to be limited to the details shown, since various modifications and structural changes may be made without departing in any way from the spirit of the present invention.

I claim:

1. An inversion-resistant tide gate valve comprising:
    (a) a generally tubular sleeve bounding a longitudinally-extending flow-through passage for fluids, said sleeve having an upstream fluid inlet end region adapted to be affixed to an effluent conduit and a downstream fluid outlet region;
    (b) said downstream fluid outlet region of said sleeve being integrally formed with a longitudinally-extending semi-cylindrical trough, said trough having a bottom wall and a pair of side walls integral with said bottom wall, said trough formed with said downstream fluid outlet region of said sleeve so as to provide a flow-through passage for said fluids;
    (c) a disc comprising a first material affixed along a first portion of its periphery to a flexible hinge member, said flexible hinge member affixed to and interposed between said disc and said downstream fluid outlet region of said sleeve, said flexible hinge member comprising a second material which is more flexible than the first material of said disc, and wherein a second portion of the periphery of said disc opposite said first portion rests within said trough on said bottom wall of said trough when said valve is in a closed position, wherein said disc opens said valve in response to head pressure within said valve; and
    (d) a bill affixed at a first end to one or more of the group consisting of the sleeve, the flexible hinge member, and the disc, said bill extending longitudinally downstream along said longitudinal axis of said trough, said bill being integrally formed with said side walls of said trough, said bill being formed of a flexible material, said bill forming an opening for discharge of fluid in response to a head pressure within said valve from said fluid, and said bill forming a seal to prevent backflow of said fluid through said valve when no head pressure is present.

2. The valve of claim 1 wherein said disc has a width that is coextensive with said pair of side walls of said trough, said disc forming a seal with said side walls when said valve is in a closed position.

3. The valve of claim 1 wherein said disc has a length along a line extending from said flexible hinge member member to said second peripheral portion, that is greater than the diameter of said flow-through passage of said sleeve.

4. The valve of claim 1, wherein said sleeve, said trough, said flexible hinge member member, said disc and said bill are each formed of one or more plies of an elastomeric material.

5. The valve of claim 1, wherein said disc is convex.

6. The valve of claim 4, wherein said sleeve and said trough include a body plate embedded within said elastomeric material.

7. The valve of claim 6 wherein said body plate is semi-cylindrical and extends longitudinally along said valve generally coextensive with a lower portion of said sleeve and said side walls and said bottom wall of said trough.

8. The valve of claim 6 wherein said body plate is made of metal.

9. The valve of claim 4, wherein said disc further includes a disc plate.

10. The valve of claim 9 wherein said disc plate is a rim coextensive with the periphery of said disc.

11. The valve of claim 9, wherein said disc plate is embedded within said one or more plies of said disc.

12. The valve of claim 4, wherein at least one of the group consisting of said disc, said sleeve, said trough, said bill and said flexible hinge member member has a Shore A durometer of 65 to 95.

13. The valve of claim 1 wherein said flexible member is an elastomeric hinge.

14. The valve of claim 13 wherein said flexible hinge member includes an expansion loop.

15. The valve of claim 1 wherein at least one of the group consisting of said side walls, said bottom wall, and said sleeve include an integral rubber seat, wherein said disc rests on said rubber seat when said valve is in a closed position.

16. The valve of claim 1 wherein at least a portion of each of said side walls is flared outwardly.

17. The valve of claim 1 wherein the bill is located on an outer surface of the disc and wherein the bill is affixed to at least one element of the group consisting of the disc, the flexible hinge member and the sleeve.

18. The valve of claim 1 wherein the bill is located on an inner surface of the disc and wherein the bill is affixed to at least one element of the group consisting of the disc, the flexible hinge member and the sleeve.

19. The valve of claim 1 wherein the disc is embedded in the bill and wherein the bill is affixed to at least one element of the group consisting of the flexible hinge member and the sleeve.

* * * * *

UNITED STATES PATENT AND TRADEMARK OFFICE
CERTIFICATE OF CORRECTION

PATENT NO.   : 5,769,125
DATED        : June 23, 1998
INVENTOR(S)  : Michael Duer et al.

It is certified that error appears in the above-identified patent and that said Letters Patent is hereby corrected as shown below:

Column 9 Line 19 before "The fact that" insert new paragraph and the following text:
   --In a preferred embodiment, the individual elements described in Fig. 1 may not appear as discreet elements in the valve 10, but may tend to flow together particularly where the bill 36 is affixed to the outer surface of the disc 30 (as opposed to the inner surface).--.

Claim 3 Column 10 Lines 64-65 "hinge member member" should read --hinge member--.

Claim 4 Column 11 Line 2 "hinge member member" should read --hinge member--.

Claim 12 Column 11 Line 23 "hinge member member" should read --hinge member--.

Signed and Sealed this

Fifteenth Day of June, 1999

Attest:

Attesting Officer

Q. TODD DICKINSON

Acting Commissioner of Patents and Trademarks